United States Patent [19]
Kaiser

[11] 4,168,510
[45] Sep. 18, 1979

[54] TELEVISION SYSTEM FOR DISPLAYING AND RECORDING PATHS OF MOTION

[75] Inventor: Arthur Kaiser, Trumbull, Conn.

[73] Assignee: CBS Inc., New York, N.Y.

[21] Appl. No.: 869,567

[22] Filed: Jan. 16, 1978

[51] Int. Cl.² .............................................. H04N 5/22
[52] U.S. Cl. ..................................... 358/183; 358/22; 358/105
[58] Field of Search .......................... 358/22, 183, 105

[56] References Cited
U.S. PATENT DOCUMENTS

| | | | |
|---|---|---|---|
| 4,064,528 | 12/1977 | Bowerman | 358/22 |
| 4,090,221 | 5/1978 | Conner | 358/105 |

Primary Examiner—Richard Murray
Attorney, Agent, or Firm—Spencer E. Olson

[57] ABSTRACT

In television apparatus for producing signals for displaying simultaneously a succession of separated images of an object moving over a selectable time period in an otherwise static scene, the viewability of the display is improved by enhancing the contrast, either continuously or intermittently, between the images of the moving object and the background. This is accomplished by altering the amplitude of signals representing the images of the moving objects relative to the amplitude of signals representing the background.

11 Claims, 1 Drawing Figure

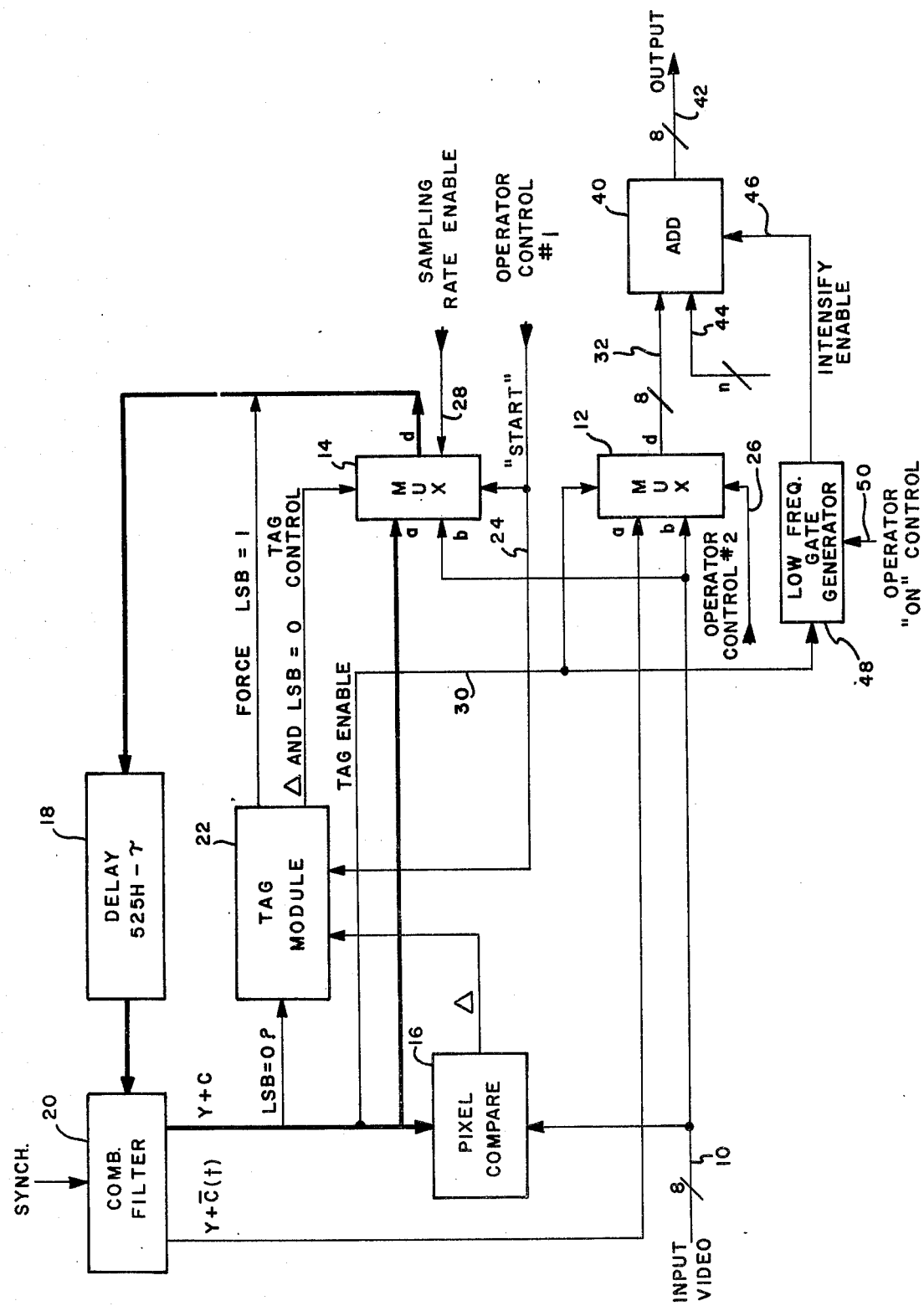

TELEVISION SYSTEM FOR DISPLAYING AND RECORDING PATHS OF MOTION

BACKGROUND OF THE INVENTION

This invention relates to television apparatus, and more particularly to a system for providing a television display which portrays the path of motion of a moving object in an otherwise static scene.

In application Ser. No. 864,405 filed Dec. 27, 1977, entitled "Television System For Displaying and Recording Paths of Motion" and assigned to the assignee of the present application, there is described a system for providing a television display which portrays the motion of an object in a scene during a specific time interval such that in addition to its present position being shown, a plurality of earlier positions, commencing with the start of the time interval, are also depicted. The system includes a storage device capable of storing one television frame and adapted to accept substitute information concerning individual picture elements of the television signal stored therein in combination with means for comparing a television frame stored in the storage device with selected subsequently arriving frames. Upon detection of differences between corresponding picture elements of the stored and subsequently arriving frames, signifying motion, the picture elements that caused the detected difference are substituted for corresponding picture elements in the stored frame, and the fact of each such substitution is stored or otherwise indicated. The system is arranged to preclude another substitution of previously substituted picture elements in the stored frame. The frequency of the comparisons, that is, the number of incoming television frames between successive comparisons, is controllable and determines the spacing in the display between successive positions of the moving object.

Although the motion detector of the described system is sufficiently sensitive to detect small differences between the moving object and the static background to effect the substitution of picture elements in the stored frame, there are situations in which the substituted picture elements have such small contrast against the background that the ultimate display is less effective than desired. There is ample contrast in the case of a putted white golf ball moving relatively slowly across a green, for example, but in the case of a pitched baseball, which may have a velocity as high as 90 to 100 miles per hour, the motion is so fast that the television pickup camera cannot generate a full amplitude signal of the moving object. In other words, whereas the baseball held stationary in front of the television camera would appear full white in the display, when it moves at high speed the camera cannot generate the full white signal with the consequence that it appears grey, and thus is not as readily discernible in the display. Accordingly, if picture elements representing an object moving with a relatively high velocity with respect to a stationary background are substituted in the stored reference frame of the above-defined described system they will appear in the display at the low level of contrast initially detected by the camera, an undesirable result from the viewer's point of view.

The primary object of the present invention is to provide a system for improving the viewability of a television display of the kind described above, particularly in situations in which the object whose motion is to be portrayed is moving relatively fast over an otherwise substantially static background. Another more general object of the invention is to provide a system for emphasizing or enhancing selected portions of a television display relative to other portions.

BRIEF DESCRIPTION OF THE INVENTION

Briefly, these objects are achieved by changing the amplitude of the signals representing the picture elements that are to be enhanced relative to the remaining picture elements. In the case of the above-described system for displaying tha path of motion of a moving object, this may be accomplished by increasing by an arbitrary amount the amplitude of the signals that the system indicates represent substituted picture elements; thus, the displayed image of the moving object will be intensified to provide greater contrast with the stationary background scene. In situations in which the background is lighter than the object whose motion is to be portrayed enhancement of contrast may, alternatively, be achieved by reducing the amplitude of the signals representing the picture elements substituted in the reference frame as a consequence of detected motion. Further improvement in viewability in certain situations is achieved by intermittently enhancing the amplitude of signals representing substituted picture elements such that in the display the portrayal of the object in motion "blinks".

BRIEF DESCRIPTION OF THE DRAWING

Other objects, features and advantages of the invention will become apparent, and its construction and operation better understood, from the following detailed description, taken in conjunction with the accompanying drawing the single FIGURE of which is a block diagram of a preferred embodiment of the invention.

DESCRIPTION OF THE PREFERRED EMBODIMENT

The invention has particular applicability in, and will be described in association with the system for portraying the motion of an object in an otherwise static scene during a specific time interval described in the aforementioned co-pending application, the description of which is hereby incorporated herein by reference. The single FIGURE of the present drawing includes a system block diagram of the motion portrayal apparatus which corresponds essentially to FIG. 3 of the aforementioned application and will be described in sufficient detail to provide a basis for an understanding of the present invention. More specifically, the invention will be described as applied to a system for storing and displaying the path of a moving object in an otherwise static background scene as applied to the NTSC television system and implemented in the digital domain; however, it is to be understood that the present invention can be used with a storage and display system suitably modified to be employed in any of the currently used color television systems.

A video input signal on input line 10, from a color television camera, for example, is encoded, as by the pulse code modulation (PCM) technique described in Pat. No. 3,946,432, utilizing an 8-bit code, and applied to the lower input terminal b of both of a pair of multiplexers 12 and 14, and also to one input terminal of a comparator 16 labelled "Pixel Compare". The output terminal d of a multiplexer 14 is connected to the input of a delay device 18 having a delay of 525H-τ; H represents one television line interval, which means that the delay device plus miscellaneous delay τ in the recirculating loop introduce a one-frame delay since there are 525 lines per frame in the NTSC system. The 525 H delay may take the form of a digital frame store having the capability of storing one pulse code modulated video frame, or, alternatively, as described in the aforementioned co-pending application, it may comprise first and second delay devices respectively having a delay of 262 H and 1 H connected in series and with their respective output terminal connected to respective inputs of a multiplexer for alternately selecting the output from the two delay devices under control of the vertical synch of the television signal such that every second field the sum of the delays will by 525 H and causing a television field to be interlaced with itself. The output of delay device 18 is applied to a comb filter 20 of known construction synchronized to the local chrominance reference and operative to produce two output signals, one a Y+C signal and the second a Y+C̄(t), namely, the luminance component plus the chrominance component inverted, with the chrominance inversion occurring every other frame to ensure that the color subcarrier of the output of delay device 18 will always be in proper phase with the local chrominance reference. The Y+C output signal from comb filter 20 is applied as a second input to comparator 36 and also to the upper input "a" of multiplexer 14. Thus, the heavy line path from the output terminal of multiplexer 14 through delay device 18, comb filter 20 and back to the upper input of multiplexr 14 is a recirculating loop for a reference frame (or self-interlaced field) stored in delay device 18.

A tag module 22 is provided for controlling insertion of substitute picture element information into the stored reference frame upon detection of motion by comparator 16 between the stored reference frame and selected subsequently arriving frames of incoming video. The tag module 22 is a logic circuit operative in response to three inputs to provide at appropriate times a control for multiplexer 14 so as to insert substituted picture element information at the proper location in the stored reference frame. The three inputs to the logic circuit are the least significant bit of the 8-bit encoded stored frame from delay device 18, a true logic input, Δ, produced when the difference between the stored frame and a selected incoming frame exceeds an arbitrary threshold level, and a logic level signal from "Operator Control #1", line 24, which is also connected to the control terminal c of multiplexer 14 and, when energized, initiates the "Start" of operation of the system. One output of tag module 22, labelled "Force LSB=1", is connected to the recirculating loop; a signal appearing thereon forces the least significant bit of the 8-bit recirculating encoded signal to equal "1". A second output of tag module 22 applies a "Tag Control" signal to multiplexer 14 whenever Δ and the least significant bit of the recirculating video signal are simultaneously equal to "0". A second control line 26, designated "Operator Control #2", is connected to the control terminal c of multiplexer 12 and determines whether the operation of the system is to be continuous or sampled, and also serves as the "Stop" control. A control line 28 designated "Sampling Rate Enable" is connected to multiplexer 14 and refers to the logic level determined by the selection by the operator of the rate of motion update, the significance of which will become evident as the description proceeds. Finally, the least significant bit of the heavy line recirculating loop is coupled via a line 30 to a second control terminal of multiplexer 12 for causing the coupling of the stored reference frame to the system output terminal 32 when multiplexer 12 is properly conditioned by actuation of "Operator Control #2". The logic states of lines 30 and 26 cause multiplexer 12 to switch from the b input to the a input indicating the insertion of prior substituted picture elements to an otherwise live video signal.

The system has three states of operation: "reset", "start" and "stop". In the reset state, "START" line 24 is "off" and the "Tag Control" and "Force LSB=1" outputs from tag module 22 are both "off". Because multiplexer 14 selects the input to the recirculating loop, the loop is not recirculating in the "reset" state because input b is selected, and the output signal at system output terminal 32 corresponds to the input video signal at input line 10 because multiplexer 12 is conditioned to select the input signal unless and until "Operator Control #2" is actuated.

In the "start" state, line 24 is turned "on", causing multiplexer 14 to couple a reference frame (or field in the case of the described alternative form of delay device 18) into the recirculating loop, and also causing the "Tag Control" output from tag module 22 to take over control of multiplexer 14 so that whenever during the time the reference is recirculating the least significant bit is equal to "0" and Δ=1, multiplexer 14 switches to input terminal b to accept substitute picture element information from the incoming signal. Also, when the system is in the continuous mode, the occurrence of a least significant bit equal to "1" on line 30, which is applied to the upper control input of multiplexer 12, causes multiplexer 12 to select chroma phase-corrected recirculating substitute picture element information appearing at its upper input terminal a.

The "stop" state of the system is initiated by operation of "Operator Control #2" which applies a control signal to control terminal c of multiplexer 12 which causes it to select the Y+C̄(t) signal appearing at its upper input terminal a. "Operator Control #1" being negated also disables the "Tag Control", thus forcing multiplexer 14 to be held in the recirculating mode. Since in this mode multiplexer 14 is selecting signal at its upper input terminal a, it will continue to recirculate the original reference frame, plus all of the substituted picture information that has been added to it during the time period between actuation of the "start" and "stop" controls.

For the purpose of ensuring that substitute picture element information inserted into the stored frame as a result of detection of motion between the stored frame and the incoming video not be "erased" by subsequent comparisons, the least significant bit of the 8-bit encoded signal is used as coding information for identifying substituted picture elements. The least significant bit of each 8-bit word is arbitrarily forced to be a "0" as it enters multiplexer 14 so that all picture elements entering the multiplexer have only seven bits of amplitude information and one bit of coding information. Thus, all picture elements in the reference frame as initially stored in the recirculating loop have eight bits of information, the least significant of which is always "0". When comparator 16 determines that a change exists between new picture elements and corresponding elements in the recirculating loop, the incoming picture element is "tagged" by the logic of tag module 22 by forcing the least significant bit that was a "0" to become a "1", and immediately replacing those which were in the stored frame initially. However, the least significant bit of a word describing a picture element of input video forced to be a "1" will go into the stored frame only if the corresponding element of stored video does not already have a "1" as the least significant bit. That is, once a given position in the reference frame, which is mostly background, acquires a "1" in the least significant bit position, it can never be changed again in the cycle between "start" and "stop".

So as not to lose chrominance information in the substituted picture element due to frame-to-frame reversal of the phase of the color subcarrier, it is essential that the phase of the color subcarrier of the substituted picture elements inserted into the stored frame be the same as that of the stored video signal. This is satisfactorily accomplished, without needless complication of the circuitry, by inserting substitute information into the stored frame from only one frame out of two, or even a greater even number of frames removed from the reference frame; this provides a definite spacing between successive display positions of the moving object and obviates the need for inverting the chrominance component within the recirculating loop. The "Sampling Rate Enable" control on line 28 provides an override control of multiplexer 14 to preset the motion update rate, at the election of the operator, at a desired even number of frames of the incoming video. Whichever sampling rate is selected, the substituted picture element information will have the correct chroma phase and will be inserted as a new picture element or elements in the frame store previously occupied by corresponding reference picture elements. Thus, in the case of a golf ball being putted on a green, the successive substitutions will, in effect, replace grass in the static scene with a white ball.

Summarizing the operation of the system, when a difference is detected between new picture elements and corresponding picture elements in the stored reference frame, signifying motion, the picture elements involved immediately replace those picture elements which were initially in the frame store at that location. Should a difference be detected in the next comparison, which may follow the previous comparison by one or several frames, the difference signal replaces those picture elements initially in the frame store at the new position of the moving object. This process continues throughout the time period during which the path of motion of the object is to be displayed, the duration of which is controlled by the operator or, alternatively, automatically predetermined. Thus, successive positions of the moving object are stored as it goes along its route, and at the end of the cycle the frozen frame with all of the different positions of the moving object is displayable. This picture information can be displayed in a variety of ways. In a first mode, the reference frame is stored upon actuation of a "start" button and displayed along with substituted picture elements from the moment of "start" until the action stops, and upon actuation of the "stop" button displaying the reference frame with all of its substituted picture elements. In another mode, a reference frame is stored at the moment of "start", and substituted picture elements are inserted therein as they occur during the action, as before, but live video along with the substituted picture elements as they occur are displayed during the action period, at the end of which, upon actuation of the "stop" button, the stored reference frame with all of its substituted picture elements is displayed. Thus, in this case, during the time interval between "start" and "stop" the displayed action is mostly live, and one will see the object moving continuously across the static background, but will also see behind the moving object the retained images of its earlier positions.

As has been indicated earlier, there often are situations in which it is desired to display successive positions of a moving object where for one reason or another, such as the rate of movement of the moving object, there is inadequate contrast in the ultimate display between the substituted picture elements and the background. In accordance with the present invention, the viewability of the successive positions of the moving object is enhanced by altering the amplitude of the signals representing the substituted picture elements to improve the contrast in the display between the moving object and the otherwise stationary background. In the case of a high speed thrown baseball where the lack of suitable contrast is due to the inability of the television camera to develop a full white signal, the contrast is preferably enhanced by increasing the amplitude of the substituted picture elements representing signals by an arbitrary amount to more nearly represent white. On the other hand, to display successive positions of a football being kicked over a goal post, for example, a situation in which the background is often lighter than the brown football, a better contrast can be obtained by reducing the amplitude of the signal representing substituted picture elements so that the football in the display tends more toward black. In essence, then, the invention contemplates the identification of those picture elements stored in the reference frame that are to be altered and, depending upon the nature of the background and how it affects the contrast between the moving object and the background, either increasing or decreasing the amplitude of the signals representing the successive positions of the moving object so as to increase the contrast between the displayed moving object and its background.

The described concept of contrast enhancement can be implemented in several ways. For example, since substituted picture elements representing successive positions of the moving object are stored in the recirculating loop, it is possible to insert at an appropriate position in the loop a circuit for altering the amplitude of the signals representing the substituted picture elements. However, since once the amplitude is altered within the loop it cannot later be changed, it has been found preferable to alter the substituted picture elements at a point outside the recirculating loop; the implementation is less complicated and it offers greater flexibility.

In the illustrated embodiment in which signals representing substituted picture elements are altered outside the recirculating loop, the output terminal 32 of multiplexer 12 is applied as one input to a circuit 40 labelled "ADD", which has an output terminal 42 connectable to suitable display apparatus (not shown). In this example, the input to adder 40 is 8-bit PCM encoded video, and absent any other signals being applied to adder 40 the signal applied to its input is coupled to its output terminal as 8-bit PCM encoded video. A second input to adder 40 is a line 44 the function of which is to inject an n-bit word, representing an arbitrary constant number, into the adder to be arithmetically added to the 8-bit words applied as the other input at such times as the amplitude of the 8-bit encoded video is to be altered. The times at which addition (or subtraction) occurs is determined by an "Intensity Enable" signal applied to the adder over line 46. Since the 8-bit word from multiplexer 12 can at any instant represent any one of 256 discrete values, and without applying any particular units to these values, can represent any one of 256 amplitude values from say, zero to 255, with zero being black and 255 being the ultimate white. If, now, n is assumed to be four and the bits of this 4-bit word correspond to the four least significant bits of the 8-bit encoded video word, fifteen units would be added to whatever happened to be the value of the input 8-bit word at the moment of addition. If, for example, a fast moving baseball which if it were stationary might have a signal value of 255 because of its bright white color, but when moving at a high rate of speed might have a value of only 70 units, the addition of 15 units, to bring its total value to 85 units, has a pronounced effect on its visibility in the displayed picture. Alternatively, n might be five, in which case thirty-one units of amplitude would be added to the signal from multiplexer 12.

As has been noted, the just-described addition takes place only when the "Intensify Enable" line is in a logic true condition, and to achieve the purposes of the invention, it is logically true only during identified substituted picture elements in the stored frame. A true logic level is applied to line 46 at appropriate times by a low frequency gate generator 48 which, in turn, is enabled by a "1" appearing on tag enable line 30. It will be recalled from the description of the basic system that line 30 is a least significant bit line and is a "1" whenever there is an update signal. Generator 48 may simply be a generator of intermittent DC, the output signal from which goes up and down in response to the presence and absence, respectively, of a tag enable "1" at its input terminal whenever generator 48 is activated by the operator, as by actuating a switch schematically illustrated at 50, when contrast enhancement is desired. When in this mode, whenever the logic level of the output of gate generator 48 is "up" the adder 40 is enabled, permitting it to add an arbitrary number, as determined by the n-bit word on line 44, to whatever signal is at that moment coming from multiplexer 12, namely, the signal that is causing the tag enable.

Although device 40 has been described as an "adder" in the context of enhancing contrast by increasing the amplitude of signals representing substituted picture elements, it is to be understood, and is within the contemplation of the invention, that it would be designed to be operative to produce a subtracting function, i.e., subtract an n-bit word from the incoming word at the moment of enable, in situations where contrast enhancement is to be achieved by "darkening" the moving object relative to the background. Moreover, although addition or subtraction have been suggested for increasing and decreasing, respectively, signal amplitude, it is within the contemplation of the invention, and within the ken of ones skilled in the art, that suitable increase or decrease of signal amplitude can be achieved by multiplication and division, respectively. Also, although it was indicated above that the bits of the n-bit word applied over line 44 correspond to the four least significant bits of the 8-bit word from multiplexer 12, they need not necessarily be the four least significant, but may be any n intermediate bits; they may be the middle four, the middle five, or some other number of bits at any desired location relative to the 8-bit word. It is a matter of design judgment, and, in a system that has been satisfactorily operated, the number of bits in the n-bit word and their location are selectable so as to be adapted to increase or decrease the number arbitrarily added (or subtracted) to the incoming word, thus accommodating a variety of operational situations for achieving a desired degree of contrast enhancement.

Another aspect of the present invention is the provision of intermittent enhancement of picture elements representing successive positions of a moving object. Although the system thus far described would improve the viewability of the path of a fast-moving baseball, the viewability may be further improved if the amplitude enhancement is turned on and off at a selected rate to call attention to the successive positions of the moving object. Intermittent intensification or "blinking" is achieved by causing gate generator 48 to have a suitable repetition frequency, say, one-half second "on" and one-half second "off", so that "Intensity Enable" line 46 will be "up" only half the time, and when it is up will be controlled by the tag enable "1" on line 30. The operator control 50 includes suitable means for determining whether the output of the gate generator is intermittent DC under control of the tag enable pulse, or a low frequency square wave, to permit selection between continuous and "blinking" enhancement. The gate generator may be simply a free-running square wave generator; that is, it needn't be synchronized to the associated television system and may operate at any rate determined to be suitable for "blinking" purposes.

While the invention has been described with reference to a specific preferred embodiment, it is intended that modifications that will now be apparent to ones skilled in the art also be encompassed by the following claims.

I claim:

1. In apparatus for deriving video signals from arriving television signals for displaying simultaneously a succession of selected separated images of an object moving over a selectable time period in an otherwise substantially static scene including means including storage means adapted to store a reference field of video, switching means normally operative to couple arriving video signals to an apparatus output terminal and operative in response to initiation of the start of a selectable time period to couple to said storage means an arriving video signal representing said scene at the start of said selectable time period, means for comparing picture elements of said stored video signal with corresponding picture elements of selected television frames subsequently arriving during said selectable time period and for controlling said switching means in response to detection of a difference between corresponding picture elements of the stored and subsequently arriving frames and to identify and store the picture element of the subsequently arriving frame that caused the difference, and means for controlling said switching means to derive at said apparatus output terminal an output video signal containing at least the said subsequently identified and stored picture elements representing a series of positions of said moving object, the apparatus further comprising:

enhancing means responsive to said identifying means for modifying the brightness value of the output video signal elements representing the moving object to increase the difference, in the output video signal, between the brightness of the moving object and the brightness of the static scene.

2. Apparatus in accordance with claim 1, wherein said enhancing means is operative to increase the amplitude of the video signal representing the picture elements substituted in the stored frame during said selectable time period relative to the video signal representing the otherwise substantially static scene.

3. Apparatus in accordance with claim 2, further including
means for intermittently increasing at a predetermined rate the amplitude of the video signal representing the picture elements substituted in the stored frame-during said selectable time period.

4. Apparatus in accordance with claim 1, wherein said enhancing means is operative to decrease the amplitude of the video signal representing the picture elements substituted in the stored frame during said selectable time period relative to the video signal representing the otherwise substantially static scene.

5. Apparatus in accordance with claim 4, further including
means for intermittently decreasing at a predetermined rate the amplitude of the video signal representing the picture elements substituted in the stored frame during said selectable time period.

6. Apparatus in accordance with claim 1, wherein said enhancing means comprises
means connected to said apparatus output terminal and controllable by said identifying means for changing by a predetermined selectable amount the amplitude of the video signal representing the picture elements substituted in the stored frame during said selectable time period.

7. Apparatus in accordance with claim 6, wherein said last-mentioned means includes operator-initiated means for intermittently changing by a predetermined selectable amount the amplitude of the video signal representing said substituted picture elements.

8. Apparatus in accordance with claim 7, wherein
said arriving television signals are digitally encoded, wherein
said storage means is a digital frame store, and wherein
said last-mentioned means comprises means enabled by said identifying means for algebraically adding a predetermined digital number to the digital number repesenting the amplitude of the picture elements substituted in the stored frame during said selectable time period.

9. Apparatus in accordance with claim 6, wherein
said arriving television signals are digitally encoded, wherein
said storage means is a digital frame store, and wherein
said last-mentioned means comprises means enabled by said identifying means for algebraically adding a predetermined digital number to the digital number representing the amplitude of the picture elements substituted in the stored frame during said selectable time period.

10. Apparatus for deriving from arriving television signals video signals for displaying simultaneously a succession of selected time-separated images of an object moving over a selectable time period in an otherwise substantially static scene, said apparatus comprising:
means responsive to video signals representing a succession of television fields for identifying and storing signal elements of selected ones of said fields representing a series of image positions of said moving object,
output means responsive to said video signals and to the said identifying and storing means to provide a composite output video signal including signal elements corresponding to image portions which have been static over a selectable time period and signal elements which represent images of the moving object and which are located with respect to the static image portion to represent the moving object in each of the positions of said series, and
enhancing means for modifying the brightness value of the output video signal elements corresponding to the moving object in its said series of positions to increase the difference, in the video output signal, between the brightness of the object in the said positions and the brightness of the background represented by the static image portions.

11. Apparatus in accordance with claim 10, wherein said apparatus further comprises:
means for changing intermittently at a predetermined rate the amount of the said difference, in the video output signal, between the brightness of the images of the moving object and the brightness of the background.

* * * * *